United States Patent [19]

Pritchard

[11] Patent Number: 4,888,911
[45] Date of Patent: Dec. 26, 1989

[54] SINKER

[76] Inventor: Kelvin R. D. Pritchard, 11 Moana Place, Morrinsville, New Zealand

[21] Appl. No.: 183,003

[22] Filed: Apr. 18, 1988

[51] Int. Cl.[4] .................................. A01K 95/00
[52] U.S. Cl. ........................................... 43/44.96
[58] Field of Search ............. 43/44.96, 44.97, 44.94, 43/43.1

[56] References Cited

U.S. PATENT DOCUMENTS

| | | | |
|---|---|---|---|
| 1,339,697 | 5/1920 | England | 43/44.96 |
| 1,711,369 | 4/1929 | Wade | 43/44.97 |
| 1,776,967 | 9/1930 | Eckart | 43/44.96 |
| 2,111,958 | 3/1938 | Bardon | 43/44.88 |
| 2,135,847 | 11/1938 | Rosenquist | 43/44.88 |
| 2,256,768 | 9/1941 | Taylor | 43/44.96 |
| 2,399,298 | 4/1946 | Sevegny | 43/44.88 |
| 2,841,916 | 7/1958 | Ueda | 43/44.96 |
| 4,019,275 | 4/1977 | Ruppe | 43/44.96 |

Primary Examiner—Gene P. Crosby
Attorney, Agent, or Firm—Abelman Frayne Rezac & Schwab

[57] ABSTRACT

A sinker is disclosed having a dense weight with a face at one end, and a length of rigid material extending from the face. The rigid material is adapted to receive a fishing line.

2 Claims, 3 Drawing Sheets

SINKER

BACKGROUND OF THE INVENTION

This invention relates to sinkers.

Fishing sinkers have two potential functions. One function is to facilitate casting of a fishing line, the other function is to anchor the fishing line once cast.

Conventional sinkers generally comprise a lead weight with an aperture in said weight, through which aperture a fishing line is threaded. These sinkers are primarily designed for anchorage with smooth casting being a secondary consideration. A smooth cast is desirable as it is the common belief of most anglers that the further out a fishing line travels the better the results obtained.

It is an object of the present invention to address the matters mentioned above.

According to the broadest aspect of the present invention there is provided a sinker comprising a dense weight with a face at one end, a length of rigid material extending from said face, said rigid material adapted to receive fishing line or the like.

According to a further aspect of the present invention the weight comprises a substantially linear body tapered at one end with a face at the other end.

According to yet another aspect of the present invention the rigid material may be configured to form a loop with two shanks extending substantially parallel to each other from said loop, with the ends of said shanks attached to the face of the weight. Preferably the dense weight is manufactured out of lead which is a material commonly used in fishing sinkers. Lead is a dense material which melts at a comparatively low temperature, is easily mouldable and sets readily.

The length of the rigid material (hereinafter referred to as attachment means) is preferably a length of galvanised wire which can be bent into a desired shape and retain that shape. The sinker weight has been configured to facilitate its passage through the air (aerodynamical behaviour). A typical casting motion is to swing a fishing line (to which a sinker is attached) from behind the angler in an overhead motion towards a body of water. It is believed that the length of rigid material extending from the weight aids in the propulsion of the line.

SUMMARY OF THE INVENTION

Sand grips may be incorporated into the sinker to anchor the fishing line once cast but these are not considered essential to the invention. The sand grips may compromise of lengths of wire extending from the weight at substantially right angles to the attachment means.

Although a variety of weights and lengths of rigid material may be used the following weights and lengths have been found useful. Please note that the title "Wire Length" refers to the amount of rigid material or wire that extends from the weight and does not refer to the actual total length of the wire.

| WEIGHT (g) | WIRE LENGTH (mm) | WEIGHT LENGTH (mm) |
| --- | --- | --- |
| 84 | 78 | 30 |
| 112 | 89 | 38 |
| 140 | 100 | 46 |

The above sinkers are designed such that for each 28 g increase (1 ounce) the length of the weight increases by 8 mm and the wire length increases by 11 mm. This linear increase is not considered essential but does provide successful sinker dimensions.

One method of making a sinker in accordance with the present invention is as follows.

Firstly a jig is used to bend the wire for the attachment means and for the sand grips. A jig over a mould for the weight holds the attachment wire therein. Likewise rubber clamps holds the sand grips in the mould. A molten substance such as lead is poured into the mould and is then cooled by a cooling sleeve such as a water jacket surrounding same. The jacket may be connected to a circulating water supply such as a hose.

The substantially linear part of the body mould is slightly tapered towards the apex so that once the lead is cooled the sinker can be removed by pulling the attachment wire. The attachment of the rubber clamps on the sand grips are such that the sand grips easily pull out of same when the sinker is removed from the mould.

Aspects of the present invention will now be described by way of example only with reference to the accompanying drawings in which:

DETAILED DESCRIPTION OF A PREFERRED EMBODIMENT

Figure 1:
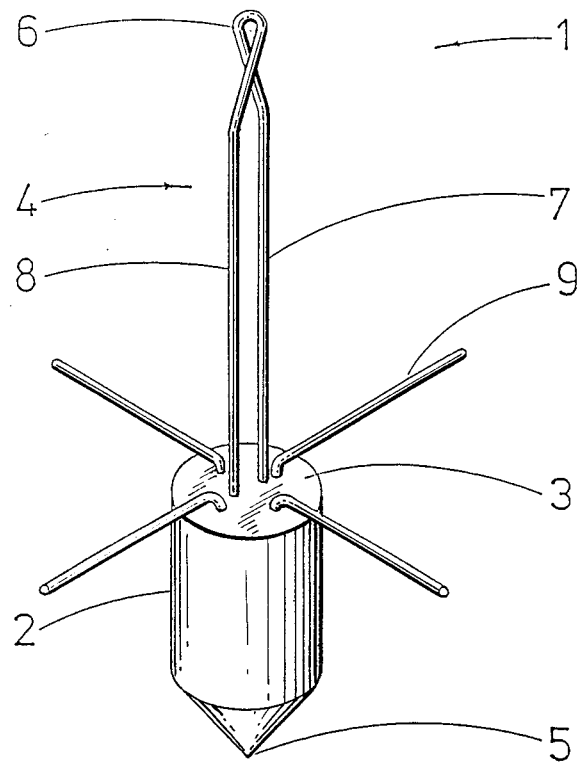
FIG. 1: is a diagrammatic perspective view of the present invention with sand grips.

With respect to the drawings there is provided a fishing sinker generally indicated by arrow 1 comprising a dense weight 2 with a base 3 at one end, a length of rigid material generally indicated by arrow 4 extending from said base 3 said rigid material being adapted to receive fishing line and the like (not shown).

The weight 2 comprises a substantially linear lead body which tapers to an apex 5 at one end.

The length of rigid material (attachment means) 4 is manufactured out of 2 mm gauge galvanised wire. The wire 4 has been twisted on a jig to form a loop 6 with two shanks 7 and 8 extending substantially parallel to each other from the loop 6, with the ends of the shanks set into the lead of the weight 2 the axial length of the loop is at least twice that of the axial length of the weight 2.

Figure 3:
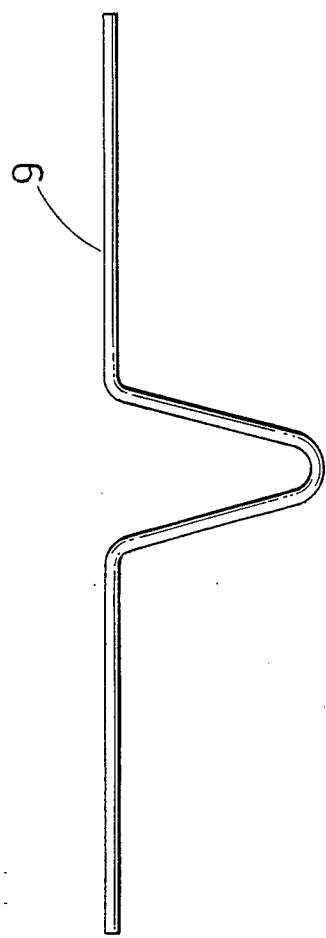
FIG. 3: is a diagrammatic view of a sand grip before incorporation into the present invention.

Sand grips 9 extend out from the body of the sinker 1. The sand grips are also manufactured out of 2 mm gauge galvanised wire and have been bent into shape as shown in FIG. 3 on a jig.

Figure 2:
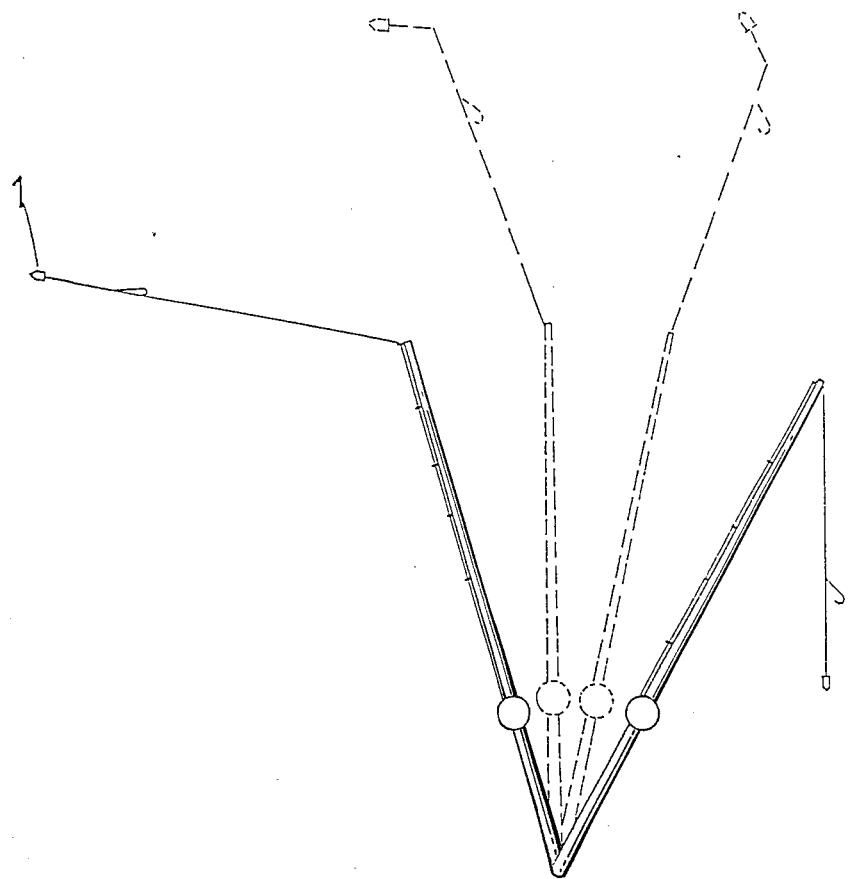
FIG. 2: is a diagrammatic view of the present invention in use.

In use the operator threads the fishing line through the loop 6 of the sinker 1. The line is then cast in a motion similar to that shown in FIG. 2 towards the appropriate body of water.

Aspects of the present invention have been described by way of example only and it should be appreciated that modifications and additions thereto may be made without departing from the scope of the appended claims.

I claim:
1. A sinker for a fishing line, comprised of:
   a solid cylindrical body formed from a heavy weight material and having an aerodynamically tapered first end and a substantially planar second end, said cylindrical body being of a first axial length; and a loop of rigid wire rigidly secured at opposite ends of said loop in said solid cylindrical body and extending substantially parallel to the longitudinal axis of said cylindrical body, said wire loop having an axial length extending from planar second end of at least twice the axial length of said body.

2. The sinker of claim 1, further including sand grips also formed of a rigid wire, and which are secured in said solid cylindrical body with free ends thereof extending radially of said body from said planar second end.

* * * * *